(12) United States Patent  
Bansal

(10) Patent No.: US 9,310,970 B2  
(45) Date of Patent: Apr. 12, 2016

(54) GRAPHICAL USER INTERFACE (GUI) FOR A CONFERENCE CALL

(71) Applicant: Sanjay Bansal, Gurgaon (IN)

(72) Inventor: Sanjay Bansal, Gurgaon (IN)

( * ) Notice: Subject to any disclaimer, the term of this patent is extended or adjusted under 35 U.S.C. 154(b) by 0 days.

(21) Appl. No.: 14/766,415

(22) PCT Filed: Feb. 7, 2014

(86) PCT No.: PCT/IN2014/000082  
§ 371 (c)(1),  
(2) Date: Aug. 6, 2015

(87) PCT Pub. No.: WO2014/122672  
PCT Pub. Date: Aug. 14, 2014

(65) Prior Publication Data  
US 2015/0378531 A1   Dec. 31, 2015

(30) Foreign Application Priority Data

Feb. 7, 2013   (IN) .............................. 357/DEL/2013

(51) Int. Cl.  
*H04N 7/15* (2006.01)  
*G06F 3/0482* (2013.01)  
(Continued)

(52) U.S. Cl.  
CPC .......... *G06F 3/0482* (2013.01); *G06F 3/04842* (2013.01); *H04L 12/1818* (2013.01); *H04L 12/1822* (2013.01); *H04L 65/1069* (2013.01); *H04L 65/403* (2013.01); *H04N 7/15* (2013.01)

(58) Field of Classification Search  
CPC .............. G06F 3/0482; H04L 12/1818; H04L 65/1069; H04L 65/403  
USPC ....................................... 348/14.03  
See application file for complete search history.

(56) References Cited

U.S. PATENT DOCUMENTS 6,785,728 B1 * 8/2004 Schneider ........... H04L 63/0218  
709/229  
6,941,359 B1 * 9/2005 Beaudoin ................ H04L 41/22  
709/221

(Continued)

FOREIGN PATENT DOCUMENTS

| WO | WO 00/60483 | 10/2000 |
| WO | WO 2012/0117422 | 3/2012 |
| WO | WO 2012/0120540 | 9/2012 |

OTHER PUBLICATIONS

International Search Report issued in corresponding PCT/IN2014/000082, dated Aug. 6, 2014, 4 pages.

(Continued)

*Primary Examiner* — Creighton Smith  
(74) *Attorney, Agent, or Firm* — Klarquist Sparkman, LLP

(57) ABSTRACT

A graphical user interface adapted to control a conference call and configured for display on a display screen of an electronic device is disclosed. The graphical user interface comprises of at least three user selectable display spaces configured for simultaneous display on the display screen of the electronic device, each space adapted to receive a user selection, wherein a first user selectable display space is configured to display a list or a portion of the list of all groups defined in an address book of the electronic device, a second user selectable display space is configured to display a list or a portion of the list of all members of a group selected from the first user selectable display space, and a third user selectable display space is configured to display members selected for the conference call from the first or second or both user selectable display spaces.

17 Claims, 6 Drawing Sheets

(51) Int. Cl.
*H04L 12/18* (2006.01)
*G06F 3/0484* (2013.01)
*H04L 29/06* (2006.01)

(56) References Cited

U.S. PATENT DOCUMENTS

| | | | |
|---|---|---|---|
| 7,587,747 B2 | 9/2009 | Maguire, Jr. |
| 7,710,448 B2 | 5/2010 | De Beer et al. |
| 8,390,663 B2 | 3/2013 | Derocher et al. |
| 8,441,516 B2 | 5/2013 | Satyanarayanan et al. |
| 8,599,236 B2 | 12/2013 | Prentice |
| 8,872,882 B2 | 10/2014 | Shanmukhadas et al. |
| 2005/0152447 A1 | 7/2005 | Jouppi et al. |
| 2007/0263079 A1 | 11/2007 | Graham et al. |
| 2008/0246834 A1 | 10/2008 | Lunde et al. |
| 2009/0079815 A1 | 3/2009 | Baird |
| 2010/0002069 A1 | 1/2010 | Eleftheriadis et al. |
| 2010/0066805 A1 | 3/2010 | Tucker et al. |
| 2010/0073454 A1 | 3/2010 | Lovhaugen et al. |
| 2010/0097441 A1 | 4/2010 | Trachtenberg et al. |
| 2010/0250315 A1 | 9/2010 | Landau et al. |
| 2010/0318921 A1 | 12/2010 | Trachtenberg et al. |
| 2011/0026441 A1 | 2/2011 | Diener et al. |
| 2011/0213806 A1* | 9/2011 | Zuber ............... G06F 17/30011 707/784 |
| 2011/0285809 A1 | 11/2011 | Feng et al. |
| 2013/0076908 A1* | 3/2013 | Bratton ............... H04N 5/232 348/159 |
| 2014/0022330 A1 | 1/2014 | Bansal |
| 2014/0022331 A1 | 1/2014 | Bansal |
| 2014/0310766 A1* | 10/2014 | Bianco ............... H04L 63/08 726/1 |

OTHER PUBLICATIONS

"Miller columns" *Wikipedia*, Dec. 23, 2012, 3 pages.
Written Opinion and International Search Report issued in other Bansal application PCT/IN2011/000151, dated Jun. 6, 2012, 6 pages.
"Cisco TelePresence System 3200," Data Sheet, Cisco Systems, Inc., www.cisco.com/en/US/prod/collateral/ps7060/ps8329/ps8330/ps9573/data_sheet_c78-457905.pdf, Jan. 2010, 7 pages.
"Multipoint Solution for Cisco Telepresence Systems," White Paper, Cisco Systems, Inc., www.cisco.com/en/US/prod/collateral/ps7060/ps8329/ps8331/ps7315/white_paper_c11-610159.pdf, Jul. 2010, 13 pages.
International Search Report issued in other Bansal application PCT/IN2012/000150, dated May 11, 2012, 1 page.

* cited by examiner

GRAPHICAL USER INTERFACE (GUI) FOR A CONFERENCE CALL

CROSS REFERENCE TO RELATED APPLICATIONS

This is the U.S. National Stage of International Application No. PCT/IN2014/000082, filed Feb. 7, 2014, which was published in English under PCT Article 21(2), which in turn claims the benefit of India Patent Application No. 357/DEL/2013, filed in India on Feb. 7, 2013. Both applications are incorporated herein by reference in their entirety.

The present invention discloses a graphical user interface (GUI) adapted to control a conference call or a telepresence call.

BACKGROUND

Effective multiple location audio and visual collaboration has become an important and effective way of communication between individuals and groups over short and long distances. These could be belonging to one enterprise or multiple people from multiple enterprises. Till now for multipoint audio-video conferences, complete dependence has been on the multiparty bridge administrator. In order to set up a conference, a user must contact a bridge administrator of the multipoint control unit (MCU) and define the user's requirements, such as the address details of the participating users and the dial in numbers of users who will participate in the conference. The bridge administrator gives the users a list of telephone numbers of the MCU, one for each conference participant or location, and sets up the MCU for the conference. The user in turn share these dial in details with each of the conference participants. All the conference participants then call their respective dial in numbers to connect to the MCU. Conferencing via MCU is a pre planned and fairly complex procedure. The other option is to have virtual meeting rooms where every participant dials in with a password and joins the meeting.

Typically such multi-party call conferencing has a highly restricted and awkward user interface. For example, in a 3 party call, a user must first call a first party, wait until they have been connected, park that call, call a second party and then connect the calls together. For more than 3-party call, connecting all the parties to the call through a user interface operated by the participants themselves, is a laborious and time-consuming process. Furthermore, each supplier of handsets and/or PABXs provided with such user interface often have multiple, and non-standard complex function buttons or key strokes for joining additional parties to an ongoing call. Current video conferencing often involves complicated call set up and usually require someone from technical support to set up the equipments prior to the conference. With time, users are more educated and wish to have self operated systems, like the way they operate their cell phones. To avoid dependency on bridge operators, it has become necessary to have a system from where they can schedule or initiate multi party calls, choose between desired profiles of the meeting. Therefore, it is desired that the non technical users participating in the audio video conference calls should be able to initiate a conference call, join an ongoing call, selectively add or disconnect individual participants in a running call and opt for other call requirements through a single and a simpler user interface.

With the emerging market of touch panel displays in smart phones and tablets, it would be a tremendous advantage that all users using either their PC or smart phone or tablet can launch and control their own multiparty audio only, video only or audio and video mixed calls at the press of a button. Such calls should be able to connect multiple participants on different available networks.

BRIEF DESCRIPTION OF DRAWINGS

The following is a brief description of the embodiments as illustrated in the accompanying drawings. It is to be understood that the features illustrated in and described with reference to the drawings are not to be construed as limiting of the scope of the invention. In the accompanying drawings.

SUMMARY

Figure 1:
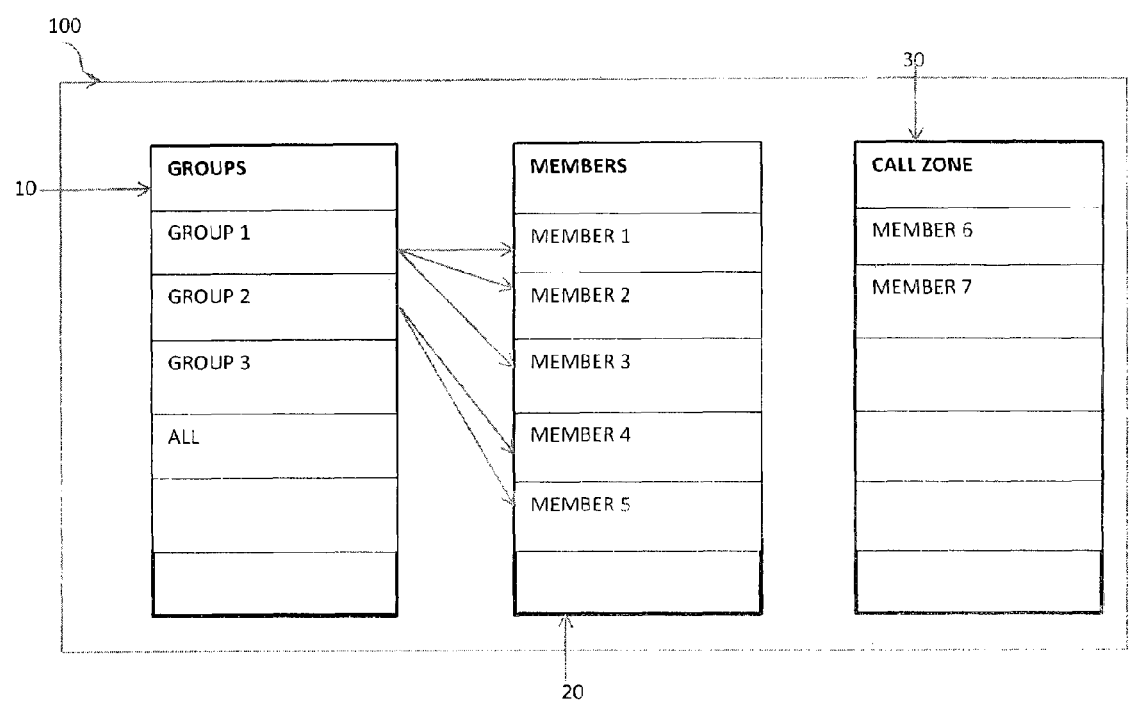
FIG. 1 illustrates a graphical user interface comprising at least three user selectable display spaces, in accordance with the teachings of the present description.

A graphical user interface adapted to control a conference call is disclosed. The graphical user interface is configured for display on a display screen of an electronic device. The graphical user interface comprises of at least three user selectable display spaces configured for simultaneous display on the display screen of the electronic device, each space adapted to receive a user selection, wherein a first user selectable display space is configured to display a list or a portion of the list of all groups defined in an address book of the electronic device, a second user selectable display space is configured to display a list or a portion of the list of all members of a group selected from the first user selectable display space, and a third user selectable display space is configured to display members selected for the conference call from the first or second or both user selectable display spaces.

A telepresence system is disclosed. The telepresence system comprises of a plurality of telepresence rooms, each telepresence room comprises of an electronic control device having a control processor and a display screen in each of the telepresence rooms, the control processor is configured to generate a graphical user interface for display on the display screen, wherein the graphical user interface is adapted to control a conference call. The graphical user interface comprises of at least three user selectable display spaces configured for simultaneous display on the display screen of the electronic control device, each space adapted to receive a user selection, wherein a first user selectable display space is configured to display a list or a portion of the list of all groups defined in an address book of a telepresence room, a second user selectable display space is configured to display a list or a portion of the list of all members of a group selected from the first user selectable display space, and a third user selectable display space is configured to display members selected for the conference call from the first or second or both user selectable display spaces.

DETAILED DESCRIPTION

It will be understood by those skilled in the art that the foregoing objects and the following description of the nature of invention are exemplary and explanatory of the invention and are not intended to be restrictive thereof.

For the purpose of promoting an understanding of the principles of the invention, reference will now be made to various alternative embodiments and specific language will be used to describe the same. It will nevertheless be understood that no limitation of the scope of the invention is thereby intended, such alterations and further modifications in the illustrated method, and such further applications of the principles of the invention as illustrated therein being contemplated as would normally occur to one skilled in the art to which the invention relates.

It will be understood by those skilled in the art that the following description is exemplary and explanatory of the invention and are not intended to be restrictive thereof.

Many of the functional units described in this specification have been labeled as modules, in order to more particularly emphasize their implementation independence. For example, a module may be implemented as a hardware circuit comprising custom very large scale integration circuits, or gate arrays, off-the-shelf semiconductors such as logic, chips, transistors, or the other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executable of an identified module need not be physically located together, but may comprise disparate instructions stored in different locations which, when joined together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data maybe collected as a single data set, or may be distributed over different locations including over different member disks, and may exist, at least partially, merely as electronic signals on a system or network.

Reference throughout this specification to "one embodiment" "an embodiment" or similar language means that a particular feature, structure, or characteristic described in connection with the embodiment is included in at least one embodiment of the present invention. Thus, appearances of the phrase "in one embodiment", "in an embodiment" and similar language throughout this specification may, but do not necessarily, all refer to the same embodiment.

A graphical user interface adapted to control a conference call is disclosed. The conference call can be an audio only or an audio video conference call and can also be a telepresence call configured for a telepresence system. The graphical user interface is configured for display on a display screen of an electronic device. The electronic device comprises of appropriate display modules and control processors to display the graphical user interface and to receive user selection. Such electronic device may be a desktop/laptop, a cell phone, a touch panel display device or any personal data assistance (PDA) which can be based on one of the multiple operating systems such as Windows, Android or IOS. In one of the embodiments, the electronic device may comprise of appropriate graphical user interface display module or may be configured to receive communication from a central server including the appropriate graphical use interface display module. The central server may also include appropriate conference call set up and call configuration modules which may be transmitted to the electronic device.

The GUI comprises of at least three user selectable display spaces. The user selectable display spaces are adapted to receive user selection. In one of the embodiments, the user selectable display spaces are texts displayed in scrollable columns. The user selectable display spaces may include a tab, graphical or textual icons, or include any other known form. In accordance with an embodiment, the GUI further comprises of a plurality of user selectable display spaces to control and configure various operations of a conference call such as dial, disconnect, select bandwidth, modes of conference such as audio and video requirements for the conference call, etc.

All three user selectable display spaces are configured for simultaneous display on the display screen of the electronic device, wherein a first user selectable display space is configured to display a list or a portion of the list of all groups defined in an address book of the electronic device, a second user selectable display space is configured to display a list or a portion of the list of all members of a group selected from the first user selectable display space, and a third user selectable display space is configured to display members selected for the conference call from the first or second or both user selectable display spaces. In accordance with an embodiment, the three user selectable display spaces can be scrolled up and down to view the entire list of the groups or members.

A user can create his address book on the electronic device. The address book of the electronic device is configured to store the call details of members who may participate in a conference call. Each member may have a GUI in accordance with the teachings of this document configured for display on an electronic device. The user can create, edit, delete and add new members to his address book from the GUI. In accordance with an embodiment, the address book may be stored in a memory unit included within the electronic device or may be stored on a central server or an external memory unit and the electronic device may access the address book from the central server or the external memory unit through communication means such as IP network. In accordance with another embodiment, an administrator can create, edit, delete and add new members to a global address book stored on a central server which can then be accessed by members participating in a conference call at different locations. The administrator may even choose the members which are to be displayed on the GUI at certain locations. For example, the administrator may choose not to display the CEO of the organization in the GUI at every member's location. In accordance with another embodiment, the members selected for a conference call do not appear in the GUI of other members, or are tagged as "not available".

In accordance with an embodiment, groups of members are created by the user or administrator and stored in the address book. These groups are created as desired by the user such as based on geographic locations, for example, all members based in the city 'Delhi' are grouped as 'Delhi', all members based in the city 'Chennai' are grouped as 'Chennai', etc., or the most frequently participating members of a conference call can be grouped as 'Favourite'. Similarly, groups can be created based on any user desired criteria. The members of the groups defined in the address book are telepresence rooms or audio/video conferencing rooms.

In accordance with an embodiment, the first user selectable display space is also referred to as 'Groups' and displays all the groups created and stored for the electronic device, and also displays a group, referred to as 'All', which may include all the members irrespective of any specific group. The second user selectable display space is also referred to as 'Members' or 'Members' List', and displays all the members of a group selected from the first user selectable display space. The third user selectable display space is also referred to as 'Call Zone' and displays all members selected for a conference call from the second user selectable display space or the first user selectable display space.

For example, if a user selects 'Favourites' from the 'Groups', the members of the 'Favourite' group may be directly displayed in the 'Call Zone' for the conference call. The three user selectable display spaces are displayed simultaneously at all the times during a conference call which allows the user to view and add or delete members of a conference call at any time.

In accordance with an embodiment, the GUI is configured to automatically add a member to a conference call on selection from the first or second user selectable display spaces. For example, during an ongoing conference call, a user may select a member on the second user selectable display space, i.e. 'Members' and the selected member is added to the 'Call Zone' to be connected in the same ongoing conference call. Or the user may simply drag a member from the 'Members' to the 'Call Zone' for connecting the member to an ongoing conference call. Further, in accordance with an embodiment, the third user selectable display space is configured to remove a member from a conference call on receiving a user selection. For example, the user may select or drag a member from the third user selectable display space, i.e. the 'Call Zone', to drop the member from an ongoing conference call. The selected member gets removed from the third user selectable display space and may rejoin the second or first user selectable display spaces.

In accordance with an example, FIG. 1 illustrates a GUI (100) comprising of three user selectable display spaces, Groups (10), Members (20), and Call. Zone (30). In the embodiment illustrated, the first user selectable display space Groups (10) includes 'GROUP 1', 'GROUP 2' and 'GROUP 3' in addition to the 'ALL' group. Members of the selected 'GROUPS 1' and 'GROUP 2' have been displayed in the second user selectable display space, Members (20). 'GROUP 1' is shown to comprise of 'MEMBER 1', 'MEMBER 2', 'MEMBER 3' and 'GROUP 2' is shown to comprise of 'MEMBER 4' and 'MEMBER 5'. The Call Zone (30) displays those members, 'MEMBER 6' and 'MEMBER 7', already selected for the conference call.

Figure 2:
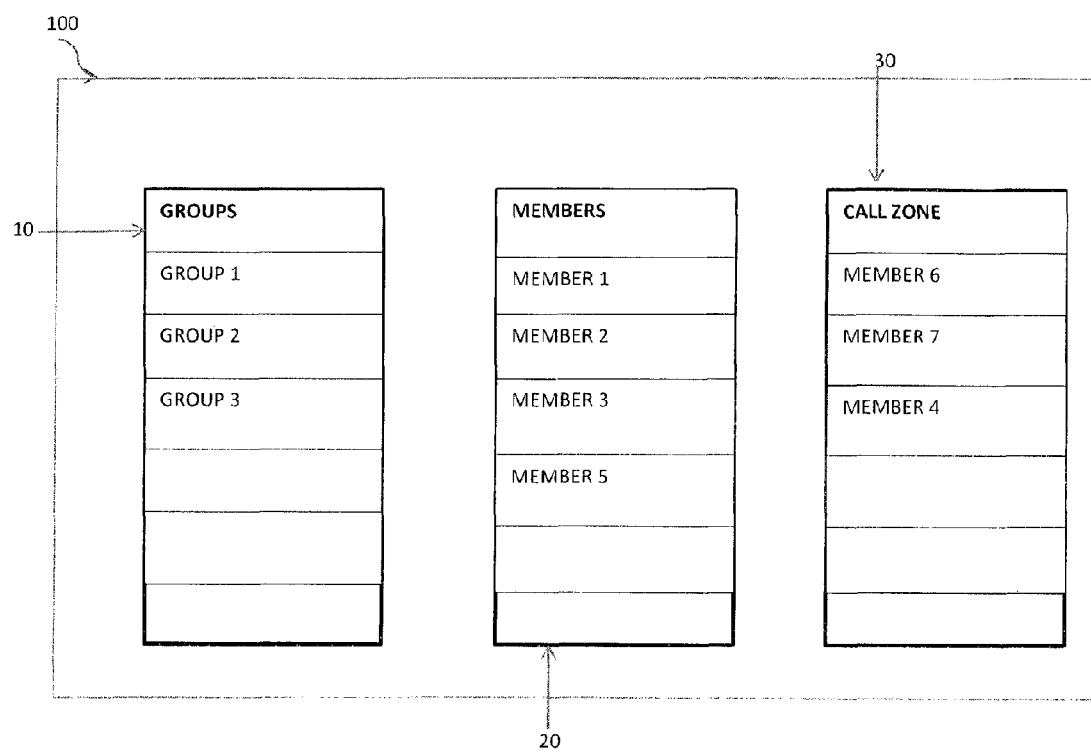
FIG. 2 illustrates a graphical user interface comprising at least three user selectable display spaces, in accordance with the teachings of the present description.

In accordance with another example, FIG. 2 shows automatically adding a member to the third user selectable display space on selection from the second user selectable display space. When 'MEMBER 4' is selected from second user selectable display space, Members (20), as shown in FIG. 1, the same is added to Call Zone (30).

In accordance with an embodiment, the 'Member's List' is configured to display all modes of operation for the members of a group selected from the first user selectable display space. The telepresence rooms and audio/video conferencing rooms are adapted to participate in a conference call in multiple modes of operation, wherein the multiple modes of operation includes modes requiring different number of displays or bandwidth.

Different modes that require different number of displays for a conference call are also referred to as 'avatars'. The displays are used for viewing the visual images of members participating in a conference call. A telepresence room with 6 displays can have an avatar that uses all 6 displays. The same telepresence room may also be configured to use 4 displays or 2 displays or only a single display. Each of these modes may in turn be configured to operate in different bandwidth or telepresence styles such as 'TeleAllpresence', as described in applicant's corresponding Indian Patent Application No. 568/DEL/2011, and as 'Dynamic Telepresence' as described in applicant's corresponding Indian Patent Application No. 681/DEL/2011. In accordance with an embodiment, the modes requiring different bandwidth may include modes of switching between members to be displayed on the displays during a conference call. Such modes of switching may include room switching mode, continuous presence mode or voice activated switching mode. The continuous presence mode requires more dedicated bandwidth as all the members at all locations are displayed at all times on the displays during the conference call. The room switching mode requires only the members of a location which is active to be displayed during the conference call. The voice switching mode requires lesser bandwidth than the continuous presence or room switching mode as only the members who are speaking in the active location are displayed during a conference call. The modes requiring different bandwidth may also include only audio or both audio video operation of each member. Only audio operation will require lesser bandwidth than both audio video operations. The user can customize various bandwidth modes for each member participating in the conference call. Each of such modes of operation is displayed in the second user selectable display space for a member.

Figure 3:
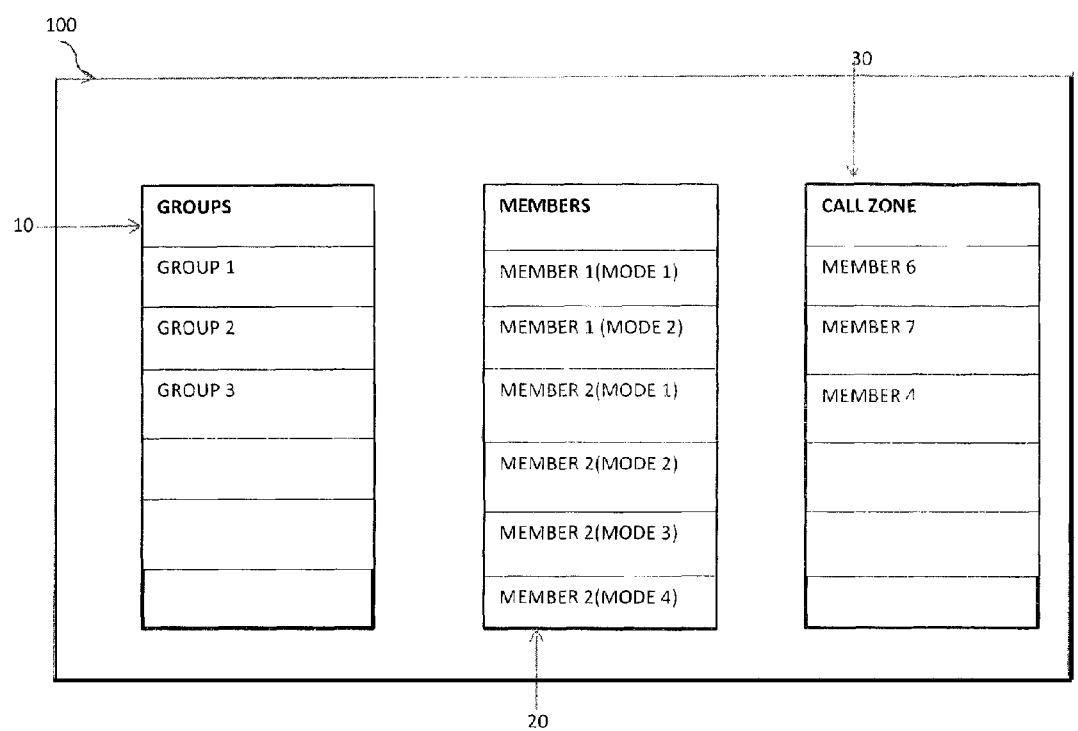
FIG. 3 illustrates a graphical user interface comprising at least three user selectable display spaces, in accordance with the teachings of the present description.

In accordance with an example, FIG. 3 shows the second user selectable display space configured to display all modes of operation for a member of a group selected from the first user selectable display space. In the embodiment illustrated, 'MEMBER 1' is shown to have two modes of operation whereas 'MEMBER 2' is shown to have four modes of operation.

In accordance with an embodiment, the user selectable display spaces are configured to display regenerated lists of available members or modes after each user selection. In accordance with another embodiment, the GUI comprises of additional user display selectable spaces that are configured for various functions as illustrated in FIGS. 4 and 5.

Figure 4:
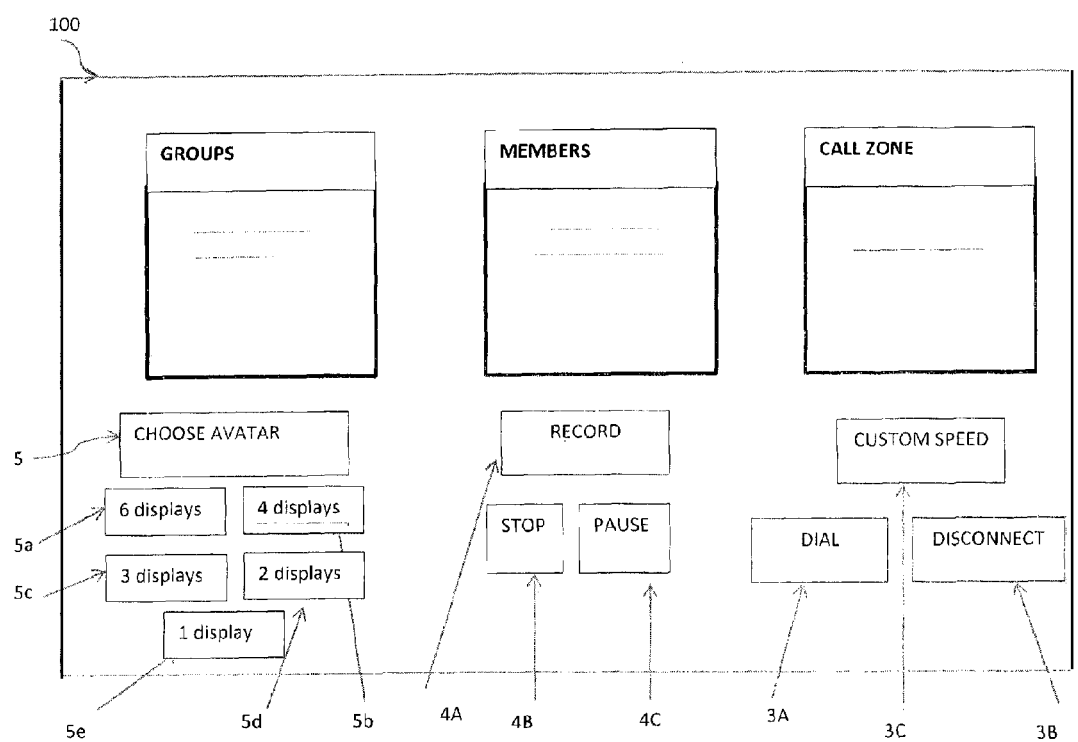
FIG. 4 illustrates a graphical user interface further comprising user selectable display spaces in accordance with the teachings of the present description.
Figure 5:
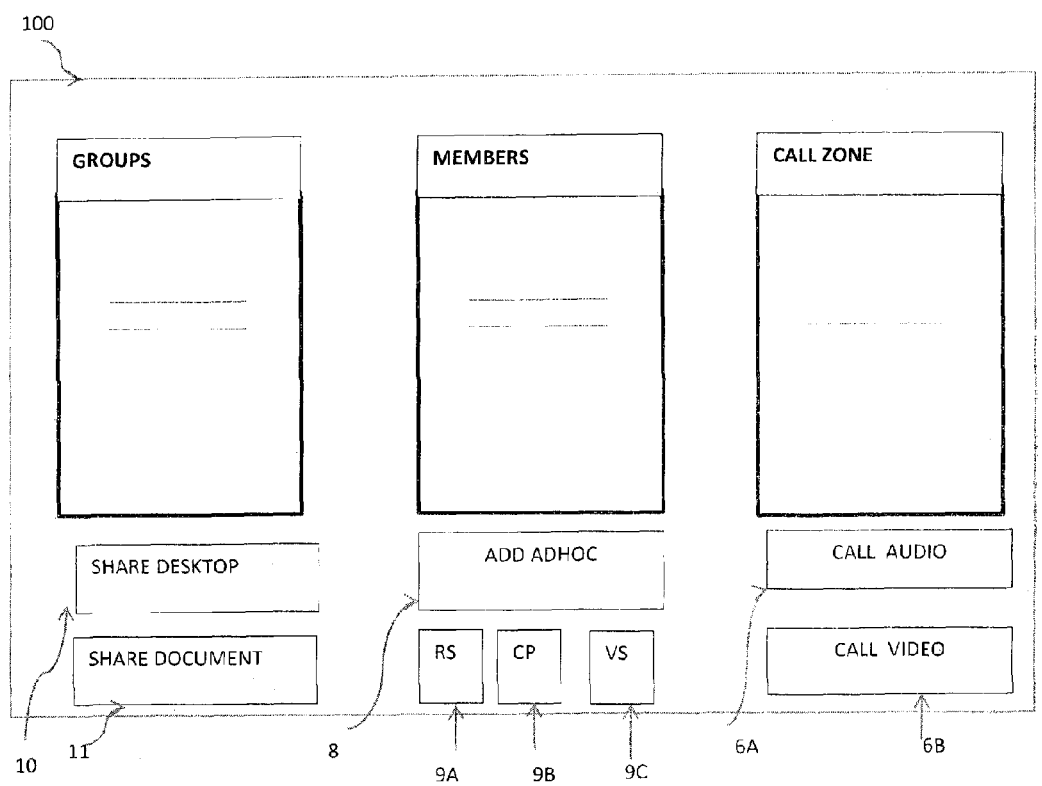
FIG. 5 illustrates a graphical user interface further comprising user selectable display spaces in accordance with the teachings of the present description.

Referring to FIG. 4, the GUI (100) is illustrated comprising of user selectable display space (3A), 'DIAL', configured to receive user selection for simultaneously connecting all the members displayed in the Call Zone (30) to a conference call; user selectable display space (3B), 'DISCONNECT', configured to receive user selection for simultaneously disconnecting all the members displayed in the Call. Zone (30) from the conference call; and user selectable display space (3C), 'CUSTOM SPEED', configured to receive user selection for customizing speed or bandwidth of a conference call or for a particular member participating in the conference call.

Further, as illustrated in FIG. 4, the GUI (100) comprises of user selectable display space (4A), 'RECORD', configured for receiving user selection to record a conference call; user selectable display space (4B), 'STOP', configured for receiving user selection to stop recording a conference call; and user selectable display space (4C), 'PAUSE', configured for receiving user selection to pause between recording a conference call.

Further, as illustrated in FIG. 4, the GUI (100) comprises of user selectable display space, (5) 'CHOOSE AVATAR', configured to receive user selection for selecting the number of displays to be used in a telepresence room. The number of displays such as 6, 4, 3 or 2 displays or a single display can be chosen by receiving user selection on user selectable display spaces '6 displays' (5a), '4 displays' (5b), '3 displays' (5c), '2 displays' (5d) or '1 display' (5e) respectively.

Referring to FIG. 5, the GUI (100) is illustrated comprising of user selectable display spaces, 'CALL AUDIO' (6A) and 'CALL VIDEO' (6B), configured to receive user selection for connecting the conference call in audio only or audio video mode respectively.

Further, as illustrated in FIG. 5, the GUI (100) comprises of user selectable display space 'ADD ADHOC' (8), configured to receive user selection for adding a member on adhoc basis. For example, a member can be added on adhoc basis by providing the PSTN/IP telephony number of the member in another user selectable display space.

Further, as illustrated in FIG. 5, the GUI (100) comprises of user selectable display space 'RS' (9A), 'CP' (9B), and 'VS' (9C), configured to receive user selection for the mode of switching of the conference call between room switching, continuous presence and voice switching mode respectively.

Further, as illustrated in FIG. 5, the GUI (100) comprises of user selectable display spaces 'SHARE DESKTOP' (10) and 'SHARE DOUCUMENT' (11), configured to receive user selection for allowing sharing of desktop and documents respectively during a conference call.

In accordance with another embodiment of, the GUI (100) comprises of user selectable display spaces configured to receive user selection for setting a password or a meeting identity number for the conference call.

A telepresence system comprising a plurality of telepresence rooms is disclosed. Each telepresence room comprises of an electronic control device having a control processor and a display screen in each of the telepresence rooms. The control processor is configured to generate a graphical user interface (GUI) for display on the display screen wherein the graphical user interface is adapted to control a conference call. The GUI is in accordance with the teachings as described above in the present document.

Figure 6:
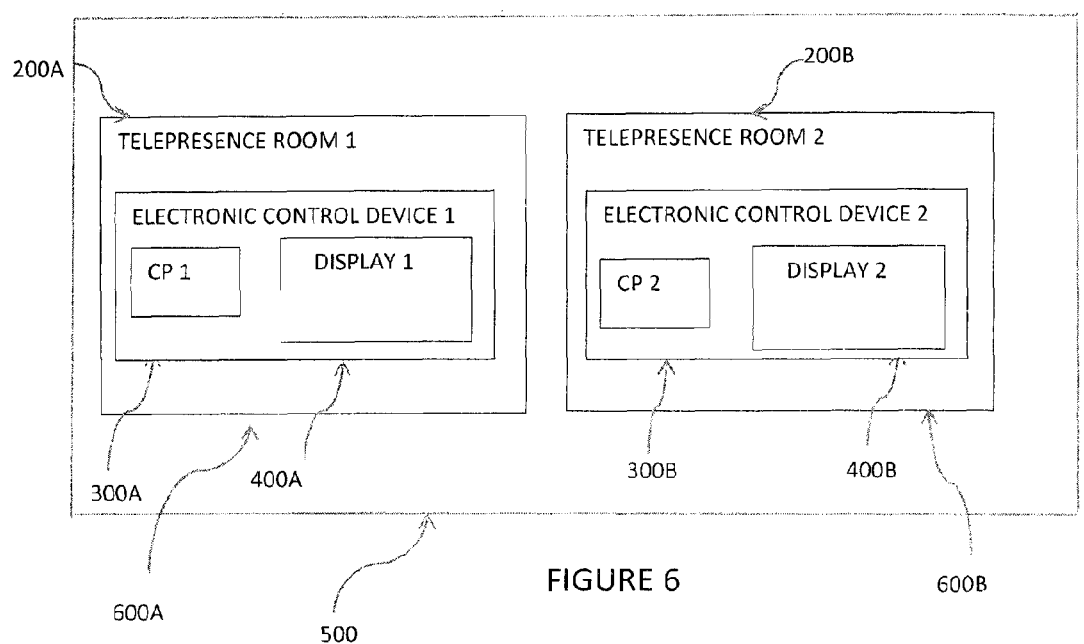
FIG. 6 illustrates a telepresence system in accordance with the teachings of the present description.

Referring to FIG. 6, a telepresence system (500) is shown comprising of telepresence rooms, 'TELEPRESENCE ROOM 1' (200A) and 'TELEPRESENCE ROOM 2' (200B). Further, 'TELEPRESENCE ROOM 1' (200A) comprises of 'ELECTRONIC CONTROL DEVICE 1' (600A). The 'ELECTRONIC CONTROL DEVICE 1' (600A) further comprises of a control processor 'CP1' (300A) and a display screen 'DISPLAY 1' (400A). Similarly, 'TELEPRESENCE ROOM 2' (200B) comprises of 'ELECTRONIC CONTROL DEVICE 2' (600B). The 'ELECTRONIC CONTROL DEVICE 2' (600B) further comprises of a control processor 'CP2' (300B) and a display screen 'DISPLAY 2' (400B).

In accordance with an embodiment, the telepresence system may further comprise of central server with appropriate conference call set up and call configuration modules. The control processor at each telepresence room is in communication with the central server and accordingly transmits and receives instructions for displaying the GUI on the display screen of the electronic control device. Further, in accordance with another embodiment, the address book of the telepresence rooms is also stored on the central server and is retrieved by the telepresence rooms through appropriate communication means such as IP network.

Specific Embodiments

A graphical user interface adapted to control a conference call and configured for display on a display screen of an electronic device is disclosed. The graphical user interface comprises of at least three user selectable display spaces configured for simultaneous display on the display screen of the electronic device, each space adapted to receive a user selection, wherein a first user selectable display space is configured to display a list or a portion of the list of all groups defined in an address book of the electronic device, a second user selectable display space is configured to display a list or a portion of the list of all members of a group selected from the first user selectable display space, and a third user selectable display space is configured to display members selected for the conference call from the first or second or both user selectable display spaces.

Such graphical user interface, wherein the members of the groups defined in the address book are telepresence rooms or audio/video conferencing rooms adapted to participate in a conference call in multiple modes of operation, wherein the multiple modes of operation includes modes requiring different number of displays or bandwidth.

Such graphical user interface, wherein the second user selectable display space is configured to display all modes of operation for a member of a group selected from the first user selectable display space.

Such graphical user interface, configured to automatically add a member to the third user selectable display space on selection from the second user selectable display space.

Such graphical user interface, configured to add a member to a conference call on selection from the first or second user selectable display spaces.

Such graphical user interface, wherein the third user selectable display space is configured to remove a member from a conference call on receiving a user selection.

Such graphical user interface, wherein the user selectable display spaces are configured to display regenerated lists of available members or modes after each user selection.

Such graphical user interface further comprising a user selectable display space configured to display available bandwidth modes for the conference call.

A telepresence system is disclosed. The telepresence system comprises of a plurality of telepresence rooms, each telepresence room comprises of an electronic control device having a control processor and a display screen in each of the telepresence rooms, the control processor is configured to generate a graphical user interface for display on the display screen, wherein the graphical user interface is adapted to control a conference call. The graphical user interface comprises of at least three user selectable display spaces configured for simultaneous display on the display screen of the electronic control device, each space adapted to receive a user selection, wherein a first user selectable display space is configured to display a list or a portion of the list of all groups defined in an address book of a telepresence room, a second user selectable display space is configured to display a list or a portion of the list of all members of a group selected from the first user selectable display space, and a third user selectable display space is configured to display members selected for the conference call from the first or second or both user selectable display spaces.

Such telepresence system, wherein the members of the groups defined in the address book are telepresence rooms or audio/video conferencing rooms adapted to participate in a conference call in multiple modes of operation, wherein the multiple modes of operation includes modes requiring different number of displays or bandwidth.

Such telepresence system, wherein the second user selectable display space is configured to display all modes of operation for a member of a group selected from the first user selectable display space.

Such telepresence system, wherein the graphical user interface is configured to automatically add a member to the third user selectable display space on selection from the second user selectable display space.

Such telepresence system, wherein the graphical user interface is configured to add a member to a conference call on selection from the first or second user selectable display spaces.

Such telepresence system, wherein the third user selectable display space is configured to remove a member from a conference call on receiving a user selection.

Such telepresence system, wherein the user selectable display spaces are configured to display regenerated lists of available members or Modes after each user selection.

Such telepresence system further comprising a user selectable display space configured to display available bandwidth modes for the conference call.

INDUSTRIAL APPLICABILITY

The disclosed graphical user interface allows the end users to make effective multi party conference calls making such systems user friendly along with effective utilization of resources such as number of display screens used during video conferencing calls. Further on, overcoming the dependency on bridge operators saves cost of the IT resources in the enterprise. A single graphical user interface display module and conference call set up module residing on the enterprises' central server can manage and connect multiple telepresence rooms and also extends its functionality to members of other locations. The described GUI can be made available for both audio only or audio and video conferencing calls as well as complex telepresence calls between telepresence rooms. The GUI can be easily accessed on Windows and Android based touch panels and also on desktops and laptops. Further, the GUI also provides the user with functionality of choosing a desired video layout, switching mode of conference calls, allocate bandwidth to each member of the conference call using a single interface of the disclosed GUI. Such GUI gives both the visual benefit and ease of operation for setting up a multi party telepresence call or conferencing calls.

I claim:

1. A graphical user interface adapted to control a conference call and configured for display on a display screen of an electronic device comprising:
at least three user selectable display spaces configured for simultaneous display on the display screen of the electronic device, each space adapted to receive a user selection;
wherein a first user selectable display space is configured to display a list or a portion of the list of all groups defined in an address book of the electronic device, a second user selectable display space is configured to display a list or a portion of the list of all members of a group selected from the first user selectable display space, and a third user selectable display space is configured to display members selected for the conference call from the first or second or both user selectable display spaces.

2. A graphical user interface as claimed in claim 1 wherein the members of the groups defined in the address book are telepresence rooms or audio/video conferencing rooms adapted to participate in a conference call in multiple modes of operation, wherein the multiple modes of operation includes modes requiring different number of displays or bandwidth.

3. A graphical user interface as claimed in claim 2 wherein the second user selectable display space is configured to display all modes of operation for a member of a group selected from the first user selectable display space.

4. A graphical user interface as claimed in claim 1 configured to automatically add a member to the third user selectable display space on selection from the second user selectable display space.

5. A graphical user interface as claimed in claim 1 configured to add a member to a conference call on selection from the first or second user selectable display spaces.

6. A graphical user interface as claimed in claim 1 wherein the third user selectable display space is configured to remove a member from a conference call on receiving a user selection.

7. A graphical user interface as claimed in claim 1 wherein the user selectable display spaces are configured to display regenerated lists of available members or modes after each user selection.

8. A graphical user interface as claimed in claim 1 further comprising a user selectable display space configured to display available bandwidth modes for the conference call.

9. A telepresence system comprising:
a plurality of telepresence rooms; each telepresence room comprising an electronic control device having a control processor and a display screen in each of the telepresence rooms; the control processor configured to generate a graphical user interface for display on the display screen;
wherein the graphical user interface is adapted to control a conference call, the graphical user interface comprising:
at least three user selectable display spaces configured for simultaneous display on the display screen of the electronic control device, each space adapted to receive a user selection;
wherein a first user selectable display space is configured to display a list or a portion of the list of all groups defined in an address book of a telepresence room, a second user selectable display space is configured to display a list or a portion of the list of all members of a group selected from the first user selectable display space, and a third user selectable display space is configured to display members selected for the conference call from the first or second or both user selectable display spaces.

10. A telepresence system as claimed in claim 9 wherein the members of the groups defined in the address book are telepresence rooms or audio/video conferencing rooms adapted to participate in a conference call in multiple modes of operation, wherein the multiple modes of operation includes modes requiring different number of displays or bandwidth.

11. A telepresence system as claimed in claim 10 wherein the second user selectable display space is configured to display all modes of operation for a member of a group selected from the first user selectable display space.

12. A telepresence system as claimed in claim 9 wherein the graphical user interface is configured to automatically add a member to the third user selectable display space on selection from the second user selectable display space.

13. A telepresence system as claimed in claim 9 wherein the graphical user interface is configured to add a member to a conference call on selection from the first or second user selectable display spaces.

14. A telepresence system as claimed in claim 9 wherein the third user selectable display space is configured to remove a member from a conference call on receiving a user selection.

15. A telepresence system as claimed in claim 9 wherein the user selectable display spaces are configured to display regenerated lists of available members or modes after each user selection.

16. A telepresence system as claimed in claim 9 further comprising a user selectable display space configured to display available bandwidth modes for the conference call.

17. One or more non-transitory computer-readable media comprising instructions that when executed cause a computing system to perform a method comprising:
   presenting a graphical user interface adapted to control a conference call and configured for display on a display screen of an electronic device;
   wherein the user interface comprises:
   at least three user selectable display spaces configured for simultaneous display on the display screen of the electronic device, each space adapted to receive a user selection;
   wherein a first user selectable display space is configured to display a list or a portion of the list of all groups defined in an address book of the electronic device, a second user selectable display space is configured to display a list or a portion of the list of all members of a group selected from the first user selectable display space, and a third user selectable display space is configured to display members selected for the conference call from the first or second or both user selectable display spaces.

* * * * *